United States Patent
Millar et al.

(10) Patent No.: US 9,746,554 B2
(45) Date of Patent: Aug. 29, 2017

(54) RADAR IMAGING SYSTEM AND RELATED TECHNIQUES

(71) Applicant: Valeo Radar Systems, Inc., Hudson, NH (US)

(72) Inventors: Jeffrey Millar, Mont Vernon, NH (US); David Insana, Manchester, NH (US)

(73) Assignee: Valeo Radar Systems, Inc., Hudson, NH (US)

( * ) Notice: Subject to any disclaimer, the term of this patent is extended or adjusted under 35 U.S.C. 154(b) by 677 days.

(21) Appl. No.: 14/247,829

(22) Filed: Apr. 8, 2014

(65) Prior Publication Data

US 2016/0349363 A1 Dec. 1, 2016

Related U.S. Application Data

(60) Provisional application No. 61/810,121, filed on Apr. 9, 2013.

(51) Int. Cl.
| | |
|---|---|
| *G01S 13/89* | (2006.01) |
| *G01S 7/35* | (2006.01) |
| *G01S 13/93* | (2006.01) |
| *G01S 13/44* | (2006.01) |
| *G01S 7/295* | (2006.01) |

(52) U.S. Cl.
CPC .............. *G01S 13/89* (2013.01); *G01S 7/352* (2013.01); *G01S 7/354* (2013.01); *G01S 13/449* (2013.01); *G01S 13/931* (2013.01); *G01S 7/2955* (2013.01); *G01S 2007/356* (2013.01)

(58) Field of Classification Search
CPC ........ G01S 13/89; G01S 7/352; G01S 13/449; G01S 13/931; G01S 2007/356; G01S 7/24; G01S 7/295; G01S 7/2955; G01S 13/93
USPC ........................................................ 342/133
See application file for complete search history.

(56) References Cited

U.S. PATENT DOCUMENTS

| | | | | |
|---|---|---|---|---|
| 2005/0285773 | A1* | 12/2005 | Hartzstein | G01S 7/032 342/70 |
| 2010/0085238 | A1* | 4/2010 | Muller-Frahm | G01S 11/12 342/70 |
| 2010/0097265 | A1* | 4/2010 | Huebschman | G01S 13/90 342/179 |
| 2012/0146835 | A1* | 6/2012 | Gross | G01S 7/35 342/109 |
| 2012/0274505 | A1* | 11/2012 | Pritt | G01S 13/9035 342/25 A |
| 2013/0335569 | A1* | 12/2013 | Einecke | G01S 13/867 348/148 |

* cited by examiner

*Primary Examiner* — Peter Bythrow
*Assistant Examiner* — Woodner T Risselin
(74) *Attorney, Agent, or Firm* — Daly, Crowley, Mofford & Durkee, LLP (57) ABSTRACT

A radar imaging system and technique is described in which the imaging system generates an image and transforms the image into world coordinates taking into account host position and heading. Once in world coordinates, successive radar images can be summed (integrated, averaged) to produce an integrated image having a resolution which is improved compared with an originally generated image.

17 Claims, 3 Drawing Sheets

RADAR IMAGING SYSTEM AND RELATED TECHNIQUES

CROSS REFERENCE TO RELATED APPLICATIONS

This application claims the benefit of U.S. Provisional Application No. 61/810,121, filed on Apr. 9, 2013 under 35 U.S.C. §119(e) which application is hereby incorporated herein by reference in its entirety.

FIELD

The concepts, systems, circuits, devices and techniques described herein relate generally to radio frequency (RF) circuits and more particularly to an RF imaging system and related techniques.

BACKGROUND

As is known in the art, existing automotive radar systems detect targets which produce a radar return signal having a signal strength which exceeds a threshold signal strength in range/Doppler space. The radar then develops an estimate of X-Y position and velocity for each target. This approach typically requires algorithms in the form of state machines and tracking with thresholds and heuristics.

As is also known, the classic implementation of synthetic aperture radar (SAR) generates images of objects on the ground from the air. By using relative movement between a ground object and an airborne platform (e.g. an airplane or a satellite) on which the SAR is mounted, the antenna is made to seem much larger than it is because the moving platform allows the SAR to repeatedly take measurements of the object from different positions. In general, SAR systems coherently combine amplitude and phase information of radar return signals from a plurality of sequentially transmitted pulses using a relatively small antenna mounted on the moving platform. A processor then integrates these signals to make them seem as though they came from a large stationary antenna rather than a relatively small moving antenna. Thus, a SAR provides a way to use signals received at multiple antenna positions to improve an angular resolution characteristic of the radar.

Conventional SAR systems (e.g. those mounted on and operating from an aircraft or satellite) typically have relatively good range resolution and relatively poor angle resolution. Synthesizing a large aperture allows the system to achieve an angle accuracy similar to range resolution. This allows the SAR system to generate an image of the ground (or infrastructure) having the same resolution in X and Y coordinates. Also, the SAR is directed toward objects very far away from the radar compared to the motion of the platform. This allows SAR systems to utilize simplifying geometrical assumptions when processing measured data. Simple SAR assumes a linear host path, constant velocity, and targets at very large distances compared with the length of the synthetic aperture. Conventional SAR systems can use such simplifying assumptions to optimize the mathematical calculations which enable the use of a fast Fourier transform (FFT) to form a target image. Also, numerous SAR techniques are known for "stretching" or partly violating the assumptions while still retaining the advantages of using the FFT to form a SAR image.

SUMMARY

It has been recognized that conventional SAR cannot implement a more general solution to radar imaging which requires working with targets close to the radar, targets that move through large angles as the host platform moves, host platforms that move on arbitrary paths, and when the radar provides more angle resolution than range resolution.

In accordance with the concepts, structures and techniques described herein, an automotive radar imaging system utilizes a two-dimensional (2D) fast Fourier transform (FFT) to separate received energy into range/Doppler bins. Each range/Doppler bin has associated therewith a received signal strength and a monopulse angle. Since the angle measurement includes a vector proportional to the signal strength in addition to a vector proportional to the noise, the monopulse angle accuracy increases with increasing signal strength. The noise vector adds to an end point of the signal vector and changes the resulting angle measurement of the combined vector. The 2D FFT maybe the same as or similar to 2D FFTs used for basic target detection and precedes the processing of radar imaging The 2D FFT spreads the energy of the scene into a 2D image which is 'sparse'. It's conventional to measure both range and Doppler with a radar. The 2D nature of the group of chirps enables a 2D measurement of large set of reflection points. The idea is that each reflection point in the scene is surrounded by no reflection. This enables separating targets at the same range by Doppler or separating targets at the same Doppler by range. This enables the angle measure to work because accurate angle measurement requires a single reflection point within the field of view of a single element of the 2D FFT.

With this particular arrangement, an automotive radar imaging system and technique for radar imaging utilizes an integrate and detect signal processing model which enables detection and measurement of static infrastructure or slow moving objects (e.g. pedestrians) from a moving host vehicle (e.g. a car, truck or other ground based or near-ground based vehicle or platform). This static and slow moving assumption allows integration of radar signals prior to detection.

This is in contrast to conventional automotive radar processing techniques in which each detection of each object (or target) stands alone. That is, in conventional automotive radars, the radar initially assumes that each detection is moving along a separate path. Detection data is then provided to a tracking algorithm. The tracking algorithm then integrates (averages) the detection data to either form a new track or improve the quality of an already formed track and reduce the random noise present on individual detections. However, by initially assuming that each radar detection is moving on a separate path, it is not possible for the automotive radar to integrate the data prior to detection, in contrast to conventional detect and track radar systems, the radar imaging system described herein implements a radar imaging technique which utilizes an integrate first and detect second process.

In one embodiment of the imaging system and technique described herein, an automotive radar system mounted on a host vehicle transmits a plurality of linear frequency modulated continuous wave (FMCW) chirp signals (or more simply, chirps). This enables conversion of each chirp signal to a first set of signal strength vs. range measurements using an FFT. The automotive radar system then transmits groups of synchronous chirp signals and processes return chirps signals using another set of FFTs to obtain a second set of signal strength vs. Doppler shift measurements which are stored in appropriate ones of frequency bins as is generally known. Each bin has stored therein a signal strength value and a monopulse angle value. Ideally, each bin has stored therein a signal strength value and a monopulse angle value for a point at the middle of the bin, although in practical systems, signal strength and monopulse angle values may be spread across multiple bins. Given a range and angle in radar coordinates, the signal strength returned from the infrastructure can be plotted as an image in x-y coordinates relative to the radar on the host vehicle. Knowing the radar mounting location on the host vehicle, the image can be plotted in a host vehicle coordinate system. Knowing the position of the host vehicle (e.g. position of the center of the vehicle, or position of some other reference point in, on about the vehicle) and heading of the host vehicle and the image can be plotted in "world" coordinates. The host vehicle position estimate determines alignment of successive radar images and an accurate host vehicle position and heading estimate ensures full resolution of the resulting image. For proper operation, errors in host vehicle position and heading need to be less than (and preferably significantly less than) the errors in range and angle coming from the radar. Once the image is available in world coordinates, successive images from a moving host vehicle having the same coordinate system can be integrated. Integrating the successive images improves the signal to noise ration and makes visible relatively small features in the infrastructure of a scene.

In this way, the automotive radar imaging system and technique described herein is able to combine (integrate) images to provide an integrated image. Since the integrated image is provided by combining images taken from significantly different angles, the integrated image is provided having improved resolution in both range and azimuth. Thus, to benefit from the relatively high angle resolution of the automotive radar system with respect to an object (or scene), it is important for the host vehicle to move through a wide range of angles relative to the object (or scene) being imaged.

It should be noted that the form of radar imaging described herein differs from SAR in that it uses angle to improve range estimates, works with host motion that follows any curving path with any acceleration, and works when imaging scenes dose to the imaging radar (e.g. within 0.5-10 meters from the host vehicle).

This is in contrast to conventional SAR systems, on the other hand, which generally have better range accuracy than angle accuracy for a given received radar signal. Therefore, signal processing in SAR systems typically work to improve angle accuracy.

It should also be noted that although at least portions of the radar imaging technique are described herein in the context of an FMCW automotive radar system, it should be appreciated that the radar imaging techniques described herein also may be used in non-FMCW radars as well as in non-automotive radar systems.

Also, while in some embodiments, a radar system (e.g. an automotive radar system) may measure range in a first FFT pass and Doppler shift in a second FFT pass (as described above), in other embodiments, a system may measure Doppler shift in a first FFT pass and range in a second FFT pass. In general, a wide variety of signal modulation and signal processing approaches exist to measure range and Doppler shift of objects. The specific approach for obtaining range, Doppler shift and angle information is not relevant provided that the necessary information is made available for use in the radar imaging systems and techniques described herein.

Significantly, the automotive radar it technique described herein makes no simplifying assumptions about host vehicle path and transforms each image into world coordinates taking into account host position and heading. It should be appreciated that overall, close targets mean more compli-cated trigonometry. Curved host motion or accelerated host motion mean more complicated conversion to world coordinates. These factors consequently result in the inability to use a simplified model with known simplified signal processing (such an FFT such as those used in typical aircraft SAR). Once in world coordinates, the successive radar images can be summed (integrated, averaged) to produce an image having a resolution which is improved compare with the resolution of prior art techniques.

It should be noted that since the techniques described herein implement radar imaging without the need to make simplifying assumptions about the host path or target geometry that are typically needed in prior art radar imaging systems to enable the use of an FFT, the techniques take more computational cycles than prior art approaches to radar imaging. However, since the application of automotive radar imaging requires only one image every few seconds and the over scene resolution is relatively low, the computational burden does not exceed processing capability in practical automotive radar systems.

The results of the radar imaging system and technique described herein can produce an estimate image of a parking spot and verify it is free of blocking objects. A system which combines radar imaging and ultrasonic sensors can further improve automated parking algorithms.

Each aspect of the radar signal has its own noise and error characteristics. In one example embodiment, a point target spreads across 2-3 bins in range and Doppler due application of a window function (e.g. a Hamming window). As noted above, each bin has stored therein a signal strength value and a monopulse angle value. The actual position of the target can only be estimated from such data points (i.e. the signal strength and monopulse angle values). In one example embodiment, a radar is provided having a range bin size of about 0.8 meters and an angle reporting system in floating point without bins. The angle reporting system reports quantization noise, phase measurement noise, and angle distortion, but when converting from range-angle to X-Y coordinates, the range error dominates in most conditions. Target position error forms an uncertainty ellipse (also sometimes referred to herein as an "error ellipse") having a major (or long) axis aligned with a line from target to host and which is longer in the range dimension and shorter in the angle dimension.

In one example embodiment, an FMCW radar concatenates ADC returns from several chirps within a burst. A 2D FFT applied to the ADC sampled data provides a separation of energy in both range and Doppler. The ability to resolve energy in range depends upon the FFT bin size which is a function of chirp slope (chirp time and bandwidth) as well as the sample rate of the ADC. In Doppler, resolution depends upon the pulse repetition interval, the wavelength, as well as the number of chirps within the burst. The radar performs this processing across 2 (or more) channels and measures the complex phase difference between corresponding FFT bins from channel to channel referred to as the monopulse phase angle (MpA). The phase difference is an input to a calibration lookup table in order to assign true angle of arrival (AoA) in vehicle coordinates to the energy within each FFT bin. The accuracy of assigning true AoA relies on the quality and resolution of the signal in the corresponding 2D FFT bin and the quality of the phase calibration curve, in one example embodiment, one degree accuracy is expected after calibration and with strong signals.

The 2D FFT which measures range and Doppler velocity have quantized and binned outputs with limited resolution.

In one example embodiment, an FMCW radar system operating at 24 GHz, using 186 MHz bandwidth and 64 chirps within a burst, the 2D FFT provides a range bin size of approximately 0.8 meters and Doppler bin size of approximately 30 cm/sec.

An angle of arrival (AoA) estimate has nearly continuous values and potentially much higher accuracy in placing targets in tangential position compared to radial position. AoA measurements have a variety of errors other than quantization errors, but each measurement has more significant bits than Range or Doppler.

Doppler measurement provide an alternative way to measure angle of arrival. The measured Doppler velocity of a static target depends upon the cosine of the angle to the target compared an angle of the host vehicle's path.

It should thus be appreciated that the specific design of radar hardware and waveform impacts the image quality. The phase calibration curve and radar to vehicle integration quality affect AoA estimate and when wrong causes distortion or blurring of the radar image. Small targets with low signal to noise ratio have noise on the angle measurement. Also, distortion is introduced into a generated image from windowing functions applied to ADC data prior to the FFT operations.

Knowing range as well as the monopulse AoA, the energy of each FFT bin can be mapped to a 2D XY space in vehicle coordinates for a single snapshot of the scene. Monopulse has an accuracy of about four times that of range, (with the scene geometry of interest), providing an elliptical point spread function (psf) that results from mapping a point target into XY space using range and angle from monopulse, making range resolution the limiting factor for resolving a point target in the 2D XY image.

Image resolution may be increased by improving fixed range resolution of the imaging radar, but range resolution depends upon bandwidth. In some applications (e.g. automotive radar applications) bandwidth is limited by regulatory (i.e. Government) control to less than 200 MHz. Knowledge of at least some dynamics of the host vehicle on which the radar is disposed, including host vehicle speed and yaw rate, can be used to determine the host velocity vector between successive snapshots. Using host vehicle dynamics, the radar referenced image from a previous snapshot can be modified, by rotation and translation, to the vehicle's current position. An integration of a modified previous snapshot (i.e. image at a specific point in time) with a current snapshot enhances the overall quality of the image.

In the application of imaging static infrastructure, all FFT bin energy belongs to objects that are motionless in world coordinates (this is accomplished by looking for regions of the sensor Doppler/Angle data space that come from static infrastructure such as a so-called "clutter ridge" described in U.S. patent application Ser. No. 14/020,053, filed Sep. 6, 2013, entitled: Method And Apparatus For Self Calibration Of A Vehicle Radar System assigned to the assignee of the present application and incorporated herein by reference in its entirety). Using the above technique over several iterations or multiple views of a single point target, in the near field of the radar, generates an image of the target, with resolution limited to the resolution of monopulse. This improved overall resolution comes directly from the integration gain of observing the point target from multiple aspect angles.

When integrating images from multiple antenna positions, the position uncertainty ellipses overlay each other at different angles due to the relatively large motion of the host compared to the distance to the target. Thus, when integrating the signal strengths of each ellipse, the overlapping of the narrow, angle based portions of the ellipse begin to dominate the target position estimate. The range estimate becomes less significant in the position estimate and overall scene resolution improves. Thus, the algorithm uses angle to enhance range (the opposite of conventional SAR).

Given an integrated image of a scene at improved resolution and improved signal to noise ratio, other techniques to detect features in the scene can be used to measure parking spots, detect small objects in parking lots, detect pedestrians, etc. Furthermore, the image of a static infrastructure can also be used to improve target detection. In particular, the radar image of static objects (infrastructure) forms a clutter map which can be subtracted from a received signal to improve the detection of moving targets. Also, as noted above, to provide the image, the imaging radar requires an estimate of angle to convert to X-Y coordinates. This angle can be provided as either a monopulse angle or a Doppler angle.

Furthermore, the use of imaging based approaches to radar signal processing enables the use of image process accelerators that have become available in modern microprocessors.

BRIEF DESCRIPTION OF THE DRAWINGS

The foregoing and other aspects, features and advantages of the concepts described herein will be apparent from the following description of particular embodiments, as illustrated in the accompanying drawings in which like reference characters refer to the same parts throughout the different views. The drawings are not necessarily to scale, emphasis instead being placed upon illustrating the principles of the invention.

DETAILED DESCRIPTION

Described herein is a radar imaging system and techniques suitable for use in an automotive radar system. Although portions of the radar imaging system and techniques are sometimes described herein within the context of a frequency modulated continuous wave (FMCW) automotive radar system, it should be appreciated that the radar imaging system and techniques described herein also may be used in non-FMCW automotive radars as well as in radars other than automotive radars. Any sensor which measures range and angle (or any other 2D coordinate system) can be used to assemble an image. In general, a wide variety of signal modulation and signal processing approaches exist to measure range and Doppler shift of objects and the particular manner in which range, Doppler shift and angle information is obtained and provided to an imaging system is not relevant. Rather, the only requirement is that the necessary information is made available to the radar imaging system to avow performance of the processing techniques described herein.

In general overview, in one example embodiment, the radar imaging system and technique described herein utilizes a pattern of range, Doppler, and angle error statistics such that the radar imaging system is provided having an angle accuracy characteristic which is higher (in some cases significantly higher) than a range accuracy characteristic. It should, of course be appreciated that in other embodiments, the techniques described herein may be applied to a radar imaging system having a range accuracy characteristic which is higher (in some cases significantly higher) than an n angle accuracy characteristic. In short, the image integration described herein works in any case to improve quality by showing what's consistent between images and suppressing what's not consistent. The resulting image quality will be proportional to the better of the two measurements. The radar imaging system described herein generates images of the same object or scene taken from significantly different angles. Ideally over more than 90 degrees (which is equivalent to saying the benefits of the "close" assumption). The benefit of more angles is increased (and ideally maximized) when the measurement resolution differs (by a substantial amount) between the two measurement dimensions. An imaging processor combines (integrates) the images to generate an integrated image. Because the images are taken from significantly different angles, the imaging processor combines the images to produce an integrated image having improved resolution in both range and azimuth angle. Thus, the radar imaging system and techniques described herein differs from SAR processing techniques in that the system and techniques described herein use angle to improve range estimates, work with host vehicle motion that follows any curving path with any acceleration, and work when imaging scenes which are relatively close to the host radar (e.g. the radar imaging system described herein images scenes which are within meters of the radar imaging system).

Furthermore, the radar imaging systems and techniques described herein make no simplifying assumption about host vehicle path and transforms each image into world coordinates taking into account host position and heading. Once in world coordinates, the successive radar images can be summed (integrated, averaged) to produce an integrated image having improved resolution.

The systems and techniques described herein are preferably used for detection and measurement of static infrastructure or slow moving objects (e.g. pedestrians) from a moving host vehicle (e.g. a car or other ground-based or near-ground-based vehicle or platform on which the radar is mounted). This static and slow moving assumption allows integration of radar signal prior to detection and subsequent formation of an image. If the radar has to assume each radar detection is moving on a separate path (i.e. part of a separate track), then it is not possible to integrate the detection data. Accordingly, in one example embodiment, image integration is focused on static scene analysis. When trackable objects appear in a scene, they tend to be suppressed by the integration. Thus, processing of data for trackable objects is handled differently from radar imaging processing.

Figure 1:
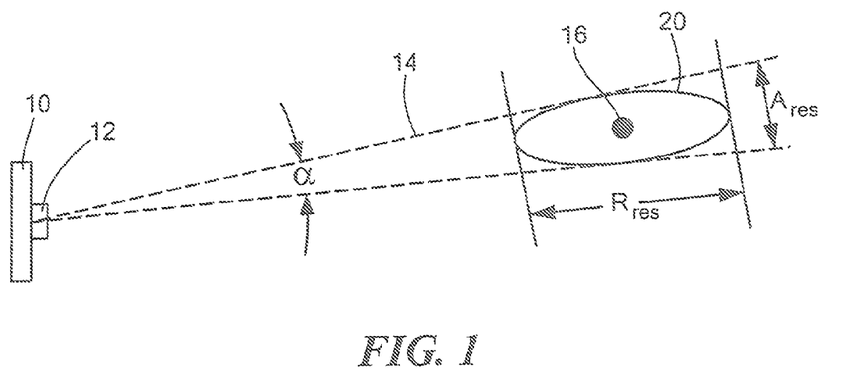
FIGS. 1 and 1A are diagrams of a radar imaging technique.
Figure 1A:
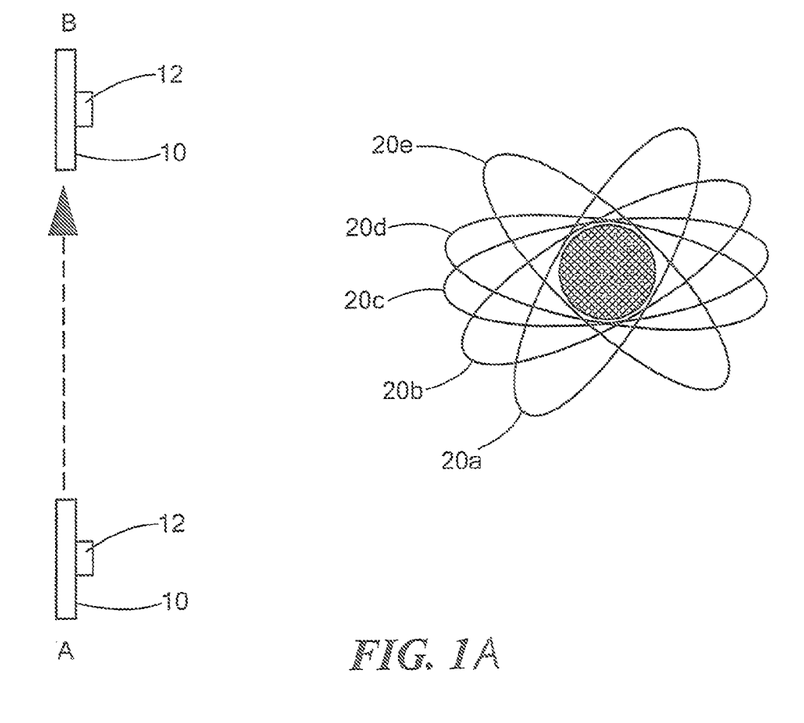

Referring now to FIGS. 1 and 1A in which like elements are provided having like reference designations, a host vehicle 10 has a radar 12 mounted thereon. The host vehicle may be provided as an automobile (e.g. a car) and hence the radar 12 is sometimes referred to as an automotive radar. It should, of course, be appreciated that host vehicle 10 may also be provided as a truck or some other type of ground-based or near-ground-based vehicle or moving platform (e.g. a low altitude manned or unmanned aerial vehicle).

Radar 10 is capable of performing detect and track functions as well as a radar Imaging function. In one example embodiment, radar 10 may be provided having a system architecture or operating mode which is the same as or similar to a highly integrated millimeter wave (MMW) radar sensor such as the types described in any of U.S. Pat. No. 6,707,419 entitled Radar Transmitter Circuitry and Techniques, filed on Aug. 16, 2001, and U.S. Pat. No. 6,642,908 entitled Switched Beam Antenna Architecture, filed on Aug. 16, 2001, each of which are assigned to the assignee of the present application and incorporated herein by reference, it should be appreciated, of course, that other radar systems can be used in accordance with the concepts, systems and techniques described herein provided, however, that the radar system utilizes a pattern of range, Doppler, and angle error statistics such that the radar system generates an uncertainty ellipse (to be described below). In some embodiments, the radar system is provided having an angle accuracy characteristic which is higher (in some cases significantly higher) than a range accuracy characteristic while in other embodiments, the radar system is provided having a range accuracy characteristic which is higher (in some cases significantly higher) than an angle accuracy characteristic. In one example embodiment, the angle has more resolution that the range, so imaging the scene from multiple angle allows the benefits of good angle resolution to improve the scene. But the same would hold true if the uncertainty ellipse had high range accuracy and low angle accuracy. Viewing the scene from multiple angles enables an integrated resolution closer to the better of the two sensing dimensions.

As radar 12 emits one or more a radio frequency (RF) signals in the form of a radar beam (with one beam 14 shown in FIG. 1) formed by a monopulse system (not shown in FIG. 1). Radar beam 14 is provided having a beamwidth defined by an angle $\alpha$ which results in an angular resolution $A_{res}$. RF energy within radar beam 14 impinges upon an object (or scene) 16 and RE energy reflected or otherwise redirected by object 16 back toward radar 12 is received by the radar 12. The radar return signals are proportional to range bin size and are impacted by fast Fourier transform (FFT) windowing which results in energy being associated with (or stored in) multiple bins.

When object 16 takes the form of a point target, then at close range (e.g. within about 0.5 meters to about 10 meters from radar 12), radar 12 provides an angle resolution $A_{res}$ (via a monopulse system) which is better than a range resolution $R_{res}$ provided by radar 12. The range and angle measurement information locate the position of object 16 to be within the area of an uncertainty ellipse 20 having major and minor axes defined, respectively, by range resolution $R_{res}$ and angle resolution $A_{res}$.

Referring now to FIG. 1A, as vehicle 10 (and thus radar 12) moves relative to object 16 (with radar 12 shown moving past object 16 from Point A to Point B in FIG. 1A), radar beam 14 impinges upon object 16 at different angles. Thus, in essence, multiple radar beams impinge upon object 16 at different angles and at different points in time.

It should be noted that in the example embodiment of FIG. 1A, five different radar beams impinge upon object 16 to provide five different position uncertainty ellipses 20a-20e. This gives rise to several observations of point target 16 along an effective aperture defined by the path of the sensor as it moves from Point A to Point B. It should, of course, be appreciated that in practical systems fewer or more than five beams may be used (thus resulting in fewer or more than five uncertainty ellipses), it should also be noted that in this example embodiment, the system is limited by angle resolution and that integration gain has a diminishing effect as a function of range as there are a fewer range of angles to integrate and less angle resolution.

The radar image technique described herein makes no simplifying assumptions about host vehicle path and transforms each image from vehicle coordinates (i.e. coordinates defined with respect to the host vehicle) into world coordinates taking into account host position and heading. Once in world coordinates, successive radar images can be summed (integrated, averaged) to produce an integrated image having a resolution which is improved compared with the resolution of images provided by prior art techniques.

Since the integrated image is provided by combining images taken from different angles, and preferably taken from significantly different angles, it is important for the host vehicle to move through a wide range of angles to thus gain the most benefit from the higher angle resolution of the radar sensor. The integrated image benefits from viewing angles over 90 and up to 180 degrees such that the uncertainty ellipses overlap by about 50-90%. The image improves for angles up to 180 degrees and for ellipse overlap up to 90%, the count depends upon the width of the ellipse. In one example embodiment all snapshot images that are generated while passing by a scene are used in the processing, but in other embodiments, fewer than all snapshot images generated while passing by a scene may be used.

In one example embodiment of the imaging system and technique described herein, the radar system 12 transmits a plurality of linear frequency modulated continuous wave (FMCW) chirp signals. This enables conversion of each chirp signal to a set of signal strength vs. range measurements using an FFT. The automotive radar system then transmits groups of synchronous chirp signals and runs another set of FFTs across respective return chirp signals to get a set of signal strength vs. Doppler shift measurements which are stored in appropriate ones of range/Doppler bins as is generally known. Each range/Doppler bin has stored therein a signal strength value and a monopulse angle value. In one example embodiment, each range/Doppler bin has stored therein a signal strength value and a monopulse angle value for a point at the middle of the bin.

Given a range and angle in radar coordinates, the signal strength returned from the infrastructure can be plotted as an image in x-y coordinates relative to the radar on the host vehicle. Knowing the radar mounting location on the host vehicle, the image can then be plotted in host vehicle coordinates. Knowing the position of the host vehicle (e.g. position of the center of the vehicle or other reference point), and heading of the host vehicle, the image can be plotted in "world" coordinates. It should be appreciated that the "center" of a vehicle may be defined and in the case in which the vehicle is an automobile, the "center" of a vehicle may sometimes be defined as the midpoint between the front wheels of the vehicle. The precise point defined to the "center" of a vehicle is not critical as long as the system knows the position and pointing angle of the radar at each FFT time. This information (i.e. position and pointing angle of the radar at each FFT time) is obtained from a vehicle bus as a report of position and heading. Often the position is reported as relative motion compared to a previous update. In that case, "world coordinates" is a precisely accurate description since it is more of a local ground reference, but that works find for image integration.

The host vehicle position estimate determines alignment of successive radar images and an accurate host vehicle position and heading estimate ensures full resolution of the resulting image. Good host vehicle position and pointing data ensures that integration process aligns the images correctly during the integration. Errors in position or pointing create a blur-like artifact in the integrated image that is not "full resolution." Errors in host vehicle position and heading should be less (and ideally much less) than the errors in range and angle coming from the radar. This is true for any image stacking technique and is also true for any sensor which reports 2D data with differing resolution on each data channel and is also true for any radar or sensor having 2 or more orthogonal measures of the scene with differing error characteristics. Once the image is available in world coordinates, successive images from a moving host vehicle having the same coordinate system can be combined (or integrated). In one example embodiment, summing or averaging with a number of twists such as IIR filtering (like 10% new data+90% old data) are used. Integrating the successive images improves the signal to noise ration and makes relatively small features in the infrastructure visible.

In this way, the automotive radar imaging system and technique described herein combines (integrates) images to provide improved resolution in both range an azimuth because it combines the images taken from significantly different angles.

It should be noted that the form of radar imaging described herein differs from SAR in that it uses angle to improve range estimates, works with host motion that follows any curving path with any acceleration, and works when imaging scenes close to the imaging radar (e.g. within 0.5-10 meters from the host vehicle. Mathematically, "close" means that the technique mill not yield desired results using the assumption that x~=sin(x) for small x. To make that assumption, the distance to the target has to be much greater than the distance travelled by the host sensor during the integration. That assumption, plus the straight path assumption and uniform speed assumption enables using an FFT algorithm (another FFT unrelated to the 2D FFT used for Range/Doppler processing) to synthesize hundreds or thousands of very narrow beams pointing at the scene (thus the "synthetic aperture").

The imaging system described herein utilizes image integration but does not synthesize an aperture using an FFT (as in SAR systems). The techniques described herein require viewing the target from as wide a range of angles as possible, and doesn't care about host path or acceleration and can't use the FFT as used in SAR processing. The lack of assumptions costs signal processing power, but for predetermined image sizes and/or update rates, such costs are acceptable in some applications (e.g. automotive radar systems).

Conventional SAR systems, on the other hand, are typically provided having a range accuracy characteristic which is higher (in some cases significantly higher) than an angle accuracy characteristics for a received radar signal. Therefore, signal processing in SAR systems work to improve angle accuracy rather than range accuracy.

It should be appreciated that each aspect of the radar signal has its own noise and error characteristics. However, in the example FMCW system described above, a point target spreads across 2-3 bins in range and Doppler due application of a window function (e.g. a Hamming window). Each bin has stored therein a signal strength value and a monopulse angle value (e.g. for a point at the middle of the bin). The actual position of the target can only be estimated from such data points (i.e. the signal strength and monopulse angle values). In one example embodiment, a radar is provided having a range bin size of about 0.8 meters and an angle repotting system in floating point without bins. The angle reports quantization noise, phase measurement noise, and angle distortion, but when converting from range-angle to X-Y coordinates, the range error dominates. Target position error forms an ellipse having a major (or long) axis aligned with a line from target to host and which is longer in the range dimension and shorter in the angle dimension.

In one example embodiment, an FMCW radar concatenates ADC returns from several chirp signals within a burst. A 2D FFT applied to the ADC sampled data provides a separation of energy in both range and Doppler. The ability to resolve energy in range depends upon the FFT bin size which is a function of chirp slope (chirp time and bandwidth) as well as the sample rate of the ADC. In Doppler, resolution depends upon the pulse repetition interval, the transmitted signal wavelength, as well as the number of chirps within the burst. In one example embodiment, the radar performs this processing across two channels and measures the complex phase difference between corresponding FFT bins from channel to channel referred to as the monopulse phase angle (MpA). It should be noted that systems having more than two channels may also be used. The phase difference is an input to a calibration lookup table in order to assign true angle of arrival (AoA) in vehicle coordinates to the energy within each FFT bin. The FFT that generates Range/Doppler is the same quality all the time as it relates to angle accuracy. The FFT size matters in that more Range bins means higher range resolution. The other effect that matters is that the 2D FFT image look like a series of reflection points surrounded by dark area. The monopulse angle measurement technique with two antennas requires a single reflection point the range and Doppler defined by the bin. If a bin contains two reflection points, the image is not "sparse", and the angle measurement will return an angle value somewhere between the two points.

The 2D FFT which measures range and Doppler velocity have quantized and binned outputs with limit resolution. The AoA estimate has nearly continuous values and potentially much high accuracy in placing targets in tangential position compared to radial position. AoA measurements have a variety of errors other than quantization errors but each measurement has more significant bits than range or Doppler.

Doppler measurement provides an alternative way to measure angle of arrival. The measured Doppler velocity of a static target depends upon the cosine of the angle to the target compared to an angle of the host vehicle's path.

It should be appreciated that the radar hardware and waveform design impacts image quality. The radar should measure range as accurately as possible (with accuracy being fundamentally limited by bandwidth allocated by the spectrum regulations). The radar should measure angle as accurately as possible, limited by signal to noise ratio, radar imperfections, and effects of the host vehicle body and bumper design. If Doppler is used as the source of angle estimate, the radar should measure it as accurately as possible, limited by processing power and processing timeline (should be less than 50 msec per image update while additional distortion comes from the windowing functions applied to the ADC data prior to the FFTs. In one example embodiment, an FMCW radar system operating at 24 GHz, using 186 MHz bandwidth and 64 chirps within a burst, the 2D FFT provides a range bin size of approximately 0.8 meters and Doppler bin size of approximately 30 cm/sec.

Knowing range as well as monopulse AoA, the energy of each FFT bin can be mapped to a 2D XY space in vehicle coordinates for a single snapshot of a scene. Monopulse has an accuracy of about four times (4x) that of range, providing an elliptical point spread function (psf) that results from mapping a point target into XY space using range and angle from Monopulse, making range resolution the limiting factor for resolving a point target in the 2D XV image.

Improved image resolution may be obtained by improving the fixed range resolution of the radar. Knowledge of at least some dynamics of the vehicle on which the radar is disposed, including host vehicle speed and yaw rate, can be used to determine the host velocity vector between successive snapshots. Using the host dynamics, the radar referenced image from the previous snapshot can be modified, by rotation and translation, to the vehicle's current position. An integration of the modified previous snapshot with the current snapshot enhances the overall quality of the image.

It should be appreciated that in the application of imaging static infrastructure, it is assumed that all FFT bin energy belongs to objects that are motionless in world coordinates. Using the above technique over several iterations or multiple views of a single point target in the near field of the radar generates an image of the target with resolution limited to the resolution of monopulse. This improved overall resolution comes directly from the integration gain of observing the point target from multiple aspect angles.

When integrating images from multiple antenna positions, the position uncertainty ellipses overlay each other at different angles due to the relatively large motion of the host compared to the distance to the target. Thus, when integrating the signal strengths of each ellipse, the overlapping of the narrow, angle based, parts of the ellipse begin to dominate the target position estimate. The range estimate becomes less important in the position estimate and overall scene resolution improves. Thus the algorithm uses angle to enhance range (the opposite of conventional SAR).

Given an integrated image of a scene at improved resolution and improved signal to noise ratio, other algorithms to detect features in the scene can be used to measure parking spots, detect small objects in parking lots, detect pedestrians, etc.

To provide the image, the radar needs an estimate of angle to convert to X-Y coordinates. This angle can be provided as wither a monopulse angle or a Doppler angle.

The image of the static infrastructure can be used to improve target detection. In particular, the radar image of static objects (infrastructure) forms a clutter map which can be subtracted from the signal to improve the detection of moving targets.

The use of imaging based approaches to radar signal processing enables the use of image process accelerators that have become available in modem microprocessors. The automotive camera systems include microprocessors with embedded image processing that can benefit a combined radar/camera systems, if the radar used more state machine and heuristic algorithm, image processing accelerators cannot provide any benefit.

The technique described herein implements radar imaging without the need to make simplifying assumptions about the host path or target geometry that are needed to enable the use of an FFT. This makes the technique take more computational cycles but since the application of radar imaging needs one image every few seconds and the over scene resolution is relatively low the computational burden does not exceed processing capability in practical systems.

The results of the radar imaging system and technique described herein can produce an estimate image of a parking spot and verify it is free of blocking objects. A system which combines radar imaging and ultrasonic sensors can improve automated parking algorithms.

It should be noted that Doppler radar systems typically measure range, Doppler shift, and angle. The monopulse angle accuracy increases with increasing signal strength because the angle measurement consists of a vector proportional to the signal strength plus a vector proportional to the noise. The noise vector adds to an and point of the signal vector and changes the resulting angle measurement of the combined vector. The 2D FFT mentioned here is basic target detection and precedes the processing of radar imaging In one example embodiment, a radar transmits linear frequency modulated continuous wave (FMCW) chirps which enable an FFT to convert each chirp to a set of signal strength vs. range measurements. It then transmits groups of synchronous chirps and runs another set of FFTs across the chirps to obtain a set of signal strength vs. Doppler measurements. Other radars, however, may measure Doppler in a first FFT pass and range in a second FFT pass. In general, a wide variety of signal modulation and signal processing approaches exist to measure range and Doppler of targets. The specific approach to obtaining range, Doppler and angle information is inconsequential provided the necessary information is available to the radar imaging algorithm.

Figure 2:
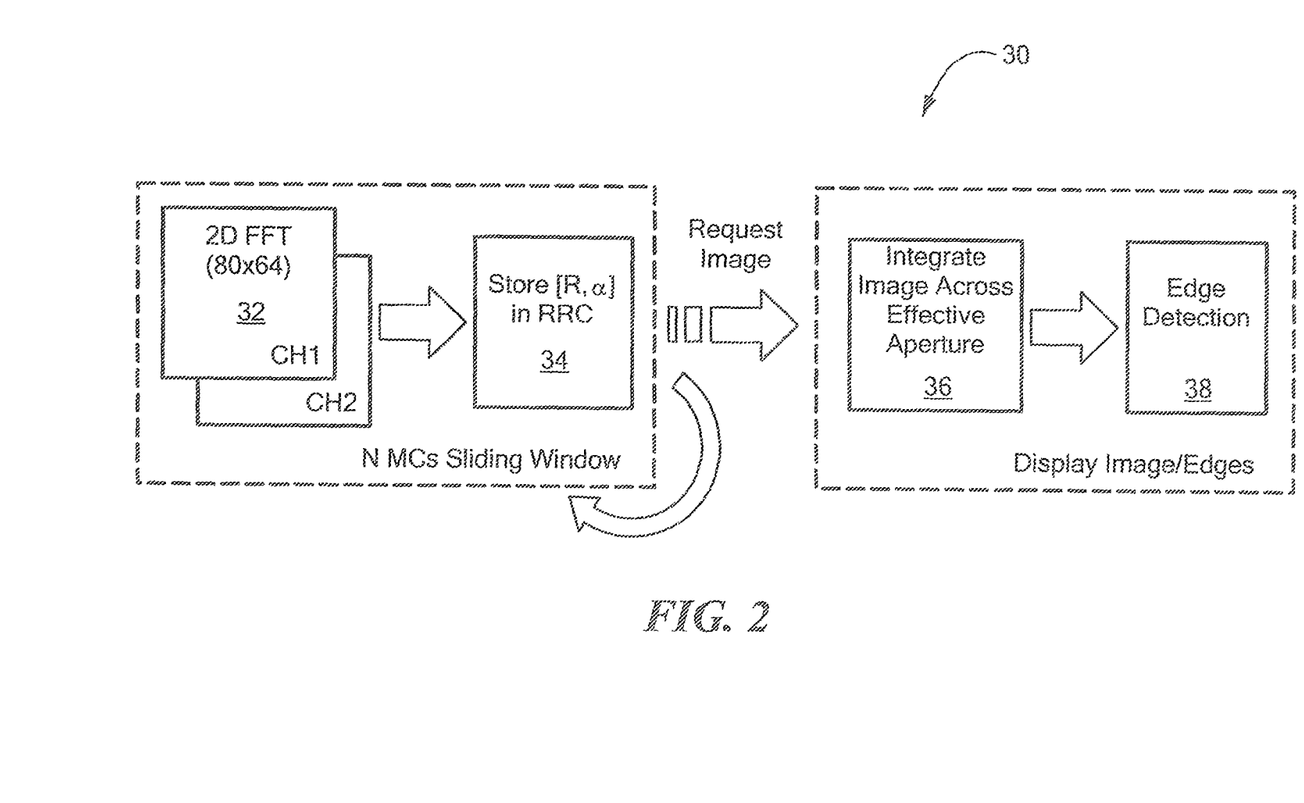
FIG. 2 is a block diagram of an example system for implementing the radar imaging technique described above in conjunction with FIG. 1.
Figure 3:
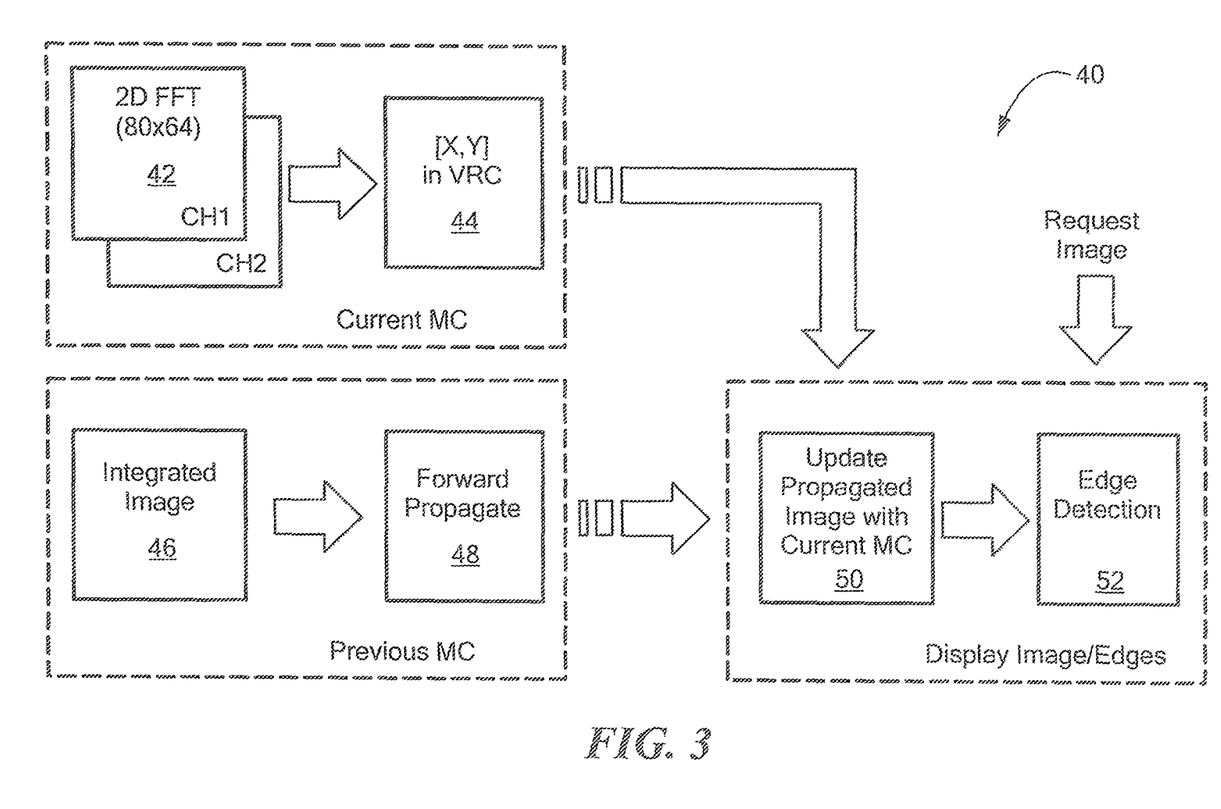
FIG. 3 is a block diagram of another example system for implementing the radar imaging technique described above in conjunction with FIG. 1.

Two possible implementations of a radar imaging processor which can be used to implement the radar imaging technique described herein are shown in FIGS. 2 and 3.

In one embodiment, the radar uses an antenna having a single wide beam. This provides for an observed scene across a large range of azimuth for each MC and aids in integration gain due to a wide range of perspective views of each object crossing through the system field of a view (FOV).

Referring now to FIG. 2, in one implementation, an imaging processor 30 of an imaging system which may, for example, be provided as part of radar 12 (FIG. 1), utilizes a two-dimensional (2D) FFT 32 for each of N channels (with two channels being shown in the example of FIG. 2) to separate received energy into range/Doppler bins. The imaging system stores N major cycles (MCs) of data (i.e. referred to above as the Image in Range, Angle space) in a memory 34. In the example system shown in FIG. 2, two dimensional (2D) FFT processing is performed on bin data (i.e. to get range and Doppler). In one example embodiment, 80×64 bins of range and Doppler separated clutter may be used. Range and angle values stored in memory 34 as range and angle coordinates [R, a] are stored in Radar Reference Coordinates (RRC). For each bin of the FFT, the range and angle are determined. The angle from one or more monopulse channels (e.g. Ch1, Ch2) or angle from Doppler (one channel with a static object assumption). Upon request, the system integrates N MCs to generate an enhanced (or integrated) image. Next, the processor rotates each MC from range and angle coordinates [R,a] in RRC to Cartesian coordinates (e.g. [X,Y]) in Vehicle Reference Coordinates (VRC). Then, the processor translates each MC to compensate for host dynamics across the effective aperture 36. Next, edge detection module 38 performs edge detection. In one example embodiment edge detection is performed by blurring the image to remove frequency components beyond the Nyquist sampling rate. A two-dimensional (2D) Laplacian ($2^{nd}$ Order derivatives of pixel magnitudes) is then performed to provide an image. It should, of course, be appreciated that other techniques for edge detection may be used.

Referring now to FIG. 3, a second example implementation of an imaging processor 40 is described in which continuous integration is used. In this approach, there is no need to store N MC worth of data. Also, the previous image is recycled. The image is updated with the best perspective of the object or scene (which is typically near 90 degrees relative to the host azimuth). This technique has a relatively slow decay rate within the update region and the image outside of update region will progress based upon host vehicle dynamics.

As will now be apparent from the description provided herein, the technique described herein implements radar imaging without the need to make simplifying assumptions about the host path or target geometry that are needed to enable the use of an FFT. This makes the technique take more computational cycles, but since the application of radar imaging needs one image every few seconds, and the over scene resolution is relatively low the computational burden does not exceed processing capability.

In one automotive radar imaging example, the results of radar imaging can produce an image of a parking spot and verify it is free of blocking objects. A system which combines both radar imaging as described herein as well as ultrasonic sensor measurements can improve automated parking algorithms.

While particular embodiments of the concepts, systems and techniques described herein have been shown and described, it will be apparent to those skilled in the art that various changes and modifications in form and details may be made therein without departing from the sprit and scope of the invention as defined by the following claims. Accordingly, the appended dams encompass within their scope all such changes and modifications.

We claim:

1. In an automotive radar system disposed in a vehicle, a radar imaging process comprising:
   (a) while the vehicle is moving, transmitting, via the automotive radar system, a first plurality of radio frequency signals toward an object;
   (b) while the vehicle is moving, receiving, via the automotive radar system in the moving vehicle, a first plurality of return signals at the automotive radar system;
   (c) converting the return signals to a set of signal strength vs. range measurements using a fast Fourier transform (FFT);
   (d) while the vehicle is moving, transmitting, via the automotive radar system a second plurality of signals;
   (e) while the vehicle is moving, receiving a second plurality of return signals at the automotive radar system, the second plurality of return signals having a Doppler shift resultant from movement of the vehicle relative an object;
   (f) converting the second plurality of return signals to a set of signal strength vs. Doppler shift measurements;
   (g) using a signal strength value, a monopulse angle value and a range and angle in radar coordinates, plotting the signal strength returned from the object as an image in x-y coordinates relative to the radar on the host vehicle;
   (h) knowing the radar mounting location on the host vehicle, plotting the image in host vehicle coordinates; and
   (i) using host vehicle position and host vehicle heading, plotting the image in world coordinates.

2. The radar imaging process of claim 1 further comprising:
   obtaining successive images in host vehicle coordinates; and
   transforming the successive images from host vehicle coordinates to world coordinates to determine alignment of one or more successive radar images with one or more previous radar images.

3. The radar imaging process of claim 2 further comprising combining the one or more successive radar images with the one or more previous radar images having the same coordinate system.

4. The radar imaging process of claim 1 wherein:
transmitting an RF signal toward an object comprises transmitting a first plurality of linear frequency modulated continuous wave (FMCW) chirp signals toward an object;
receiving a first plurality of return signals at the automotive radar system comprises receiving a first plurality of return chirp signals at the automotive radar system; and
converting the received signals to a set of signal strength vs. range measurements using a fast Fourier transform (FFT) comprises converting chirp signals to a set of signal strength vs. range measurements using a fast Fourier transform (FFT).

5. The radar imaging process of claim 4 wherein:
transmitting a second plurality of signals comprises transmitting a second plurality of FMCW synchronous chirp signals;
receiving a second plurality of return signals at the automotive radar system comprises receiving a second plurality of return chirp signals at the automotive radar system;
converting the second plurality of signals to a set of signal strength vs. Doppler shift measurements comprises converting the second plurality of chirp signals to a set of signal strength vs. Doppler shift measurements.

6. A radar imaging system comprising:
a radar transmitter configured to transmit first and second sets of linear frequency modulated continuous wave (FMCW) chirp signals;
a radar receiver for receiving a first set of return chirp signals from an object and using a fast Fourier Transform (FFT) to convert the return chirp signals to a set of signal strength versus range measurements and for receiving a second set of return chirp signals and applying FFTs to the second set of return signals to obtain a set of signal strength versus Doppler shift measurements; and
a processor to receive from the receiver a range and angle in radar coordinates, and to plot the signal strength returned from the object as an image in x-y coordinates relative to the radar on the host vehicle.

7. The radar imaging system of claim 6 wherein the processor utilizes a radar mounting location on the host vehicle to plot the image in host coordinates.

8. The radar imaging system of claim 7 wherein the processor utilizes a position of the vehicle and a heading of the vehicle to plot the object in world coordinates.

9. The radar imaging system of claim 8 wherein the processor utilizes the vehicle position estimate to determine the alignment of successive radar images.

10. The radar imaging system of claim 8 wherein once the image is available in world coordinates, the processor combines successive images from the host vehicle having the same coordinate system so as to provide an integrated image having a signal to noise ratio which is improved compared with the signal to noise ratio in the first image.

11. The radar imaging system of claim 8 wherein the second set of FMCW chirp signals correspond to groups of synchronous chirp signals transmitted by said transmitter; and
another set of FFTs across the chirps to obtain a set of signal strength vs Doppler measurements.

12. The radar imaging system of claim 8 wherein the imaging radar measures Doppler in a first FFT pass and range in a second FFT pass.

13. For a radar disposed on a vehicle, a radar imaging process comprising:
(a) moving the vehicle such that the radar traverses a plurality of different positions
(b) at each of the plurality of different radar positions, transmitting non-Doppler shifted radio frequency (RF) signals toward an object;
(c) receiving Doppler-shifted return signals from each of the transmitted RF signals wherein the Doppler shift is resultant from movement of the vehicle relative to the object;
(d) forming a set of uncertainty ellipses for each of the return signals; and
(e) forming an image based upon the set of uncertainty ellipses;
(f) generating an image in host vehicle coordinates;
(g) generating an image in world coordinates; and
(h) combining images in world coordinates to provide an integrated image.

14. The radar imaging process of claim 13 wherein forming a set of uncertainty ellipses from the return signals comprises using fast Fourier transforms (FFT) to convert first ones of the received chirp signals to a set of signal strength versus range measurements and first ones of the received chirp signals to a set signal strength versus Doppler shift measurements.

15. The radar imaging process of claim 13 wherein at each of a plurality of different radar positions, transmitting a radio frequency signal toward an object comprises transmitting linear frequency modulated continuous wave (FMCW) chirp signals toward an object.

16. The radar imaging process of claim 13 wherein transmitting RF signals toward an object comprises:
(a1) transmitting a first set of linear frequency modulated continuous wave (FMCW) chirp signals; and
(a2) transmitting groups of synchronous chirp signals.

17. The radar imaging process of claim 16 wherein forming a set of uncertainty ellipses for each of the return signals comprises:
applying a fast Fourier transform (FFT) to convert chirp signal to a set of signal strength versus range measurements; and
applying a set of fast Fourier transforms across the groups of synchronous chirp signals to obtain a set of signal strength versus Doppler shift measurements.

* * * * *